United States Patent
Fleming, III

(10) Patent No.: US 8,689,511 B2
(45) Date of Patent: Apr. 8, 2014

(54) METHOD AND SYSTEM FOR INTERCONNECTING STRUCTURAL PANELS

(76) Inventor: Joseph C. Fleming, III, Pomona, CA (US)

( * ) Notice: Subject to any disclaimer, the term of this patent is extended or adjusted under 35 U.S.C. 154(b) by 0 days.

(21) Appl. No.: 13/606,391

(22) Filed: Sep. 7, 2012

(65) Prior Publication Data

US 2013/0239507 A1    Sep. 19, 2013

Related U.S. Application Data

(63) Continuation-in-part of application No. 12/590,352, filed on Nov. 5, 2009, now Pat. No. 8,322,104, which is a continuation-in-part of application No. 12/584,165, filed on Aug. 31, 2009, now Pat. No. 8,252,137.

(51) Int. Cl.
*E04B 2/42* (2006.01)
*E04B 2/00* (2006.01)

(52) U.S. Cl.
USPC ....... 52/582.1; 52/587.1; 52/586.1; 52/585.1; 52/36.1

(58) Field of Classification Search
USPC .................. 52/582.1, 36.4, 36.5, 36.6, 582.2, 52/587.1, 586.2, 586.1, 585.1, 583.1, 52/584.1, 36.1
See application file for complete search history.

(56) References Cited

U.S. PATENT DOCUMENTS

| | | | |
|---|---|---|---|
| 1,843,430 A * | 2/1932 | Mayer | 52/586.1 |
| 2,815,795 A | 12/1957 | Vander Poel | |
| 2,910,396 A | 10/1959 | Randall et al. | |
| 3,077,223 A | 2/1963 | Hartsell et al. | |
| 3,235,920 A * | 2/1966 | Davis | 52/586.1 |
| 3,386,218 A | 6/1968 | Scott | |
| 3,483,070 A | 12/1969 | Kennedy et al. | |
| 3,490,800 A * | 1/1970 | Wissler | 52/586.2 |
| 3,512,819 A * | 5/1970 | Gillingwater et al. | 52/461 |
| 3,626,652 A * | 12/1971 | Hanley | 52/586.2 |
| 3,640,039 A | 2/1972 | McKee et al. | |
| 3,700,522 A | 10/1972 | Wonderly | |
| 3,722,157 A * | 3/1973 | Prokop | 52/481.2 |
| 3,895,144 A | 7/1975 | Kiefer | |
| 4,093,762 A | 6/1978 | Kiefer | |
| 4,349,303 A | 9/1982 | Liebel et al. | |
| 4,603,531 A | 8/1986 | Nash | |
| 4,730,428 A | 3/1988 | Head et al. | |
| 5,480,117 A | 1/1996 | Fleming, III | |

(Continued)

FOREIGN PATENT DOCUMENTS

JP    4-112001    4/1992

OTHER PUBLICATIONS

Paper honeycomb production, http://paper-honeycomb.com, 2 pages, May 15, 2009.

(Continued)

*Primary Examiner* — Jeanette E. Chapman
(74) *Attorney, Agent, or Firm* — Weide & Miller, Ltd.

(57) ABSTRACT

Building or structural panels may be joined, such as to form walls or floors. The panels may be connected in various orientations via one or more connectors. The connectors may mount to anchors associated with the panels. The panels may have outer skins located over an expanded core comprising a matrix of supporting elongate members and voids or openings, with the anchors located at edges of the panels.

9 Claims, 12 Drawing Sheets

(56) References Cited

U.S. PATENT DOCUMENTS

| | | | |
|---|---|---|---|
| 5,592,787 A | 1/1997 | Ophardt | |
| 5,592,794 A * | 1/1997 | Tundaun | 52/220.7 |
| 5,601,266 A | 2/1997 | Fleming, III | |
| 5,804,278 A | 9/1998 | Pike | |
| 6,216,397 B1 | 4/2001 | Chang | |
| 6,218,612 B1 | 4/2001 | McKitrick et al. | |
| 6,499,262 B1 | 12/2002 | Pinchot et al. | |
| 6,546,684 B2 | 4/2003 | Waalkes et al. | |
| 6,799,404 B2 | 10/2004 | Spransy | |
| D523,780 S | 6/2006 | Conny et al. | |
| D533,950 S | 12/2006 | Givoni | |
| 7,152,383 B1 * | 12/2006 | Wilkinson et al. | 52/581 |
| 7,288,164 B2 | 10/2007 | Roberge et al. | |
| D556,346 S | 11/2007 | Schulte | |
| D563,215 S | 3/2008 | Collins et al. | |
| 8,252,137 B2 | 8/2012 | Fleming, III | |
| 8,322,104 B2 | 12/2012 | Fleming, III | |
| 2002/0108323 A1 * | 8/2002 | Gruber | 52/177 |
| 2003/0209701 A1 | 11/2003 | Goddard | |

OTHER PUBLICATIONS

Periodic Cellular Materials: Manufacturing, www.ipm.virginia.edu, 6 pages, May 15, 2009.

* cited by examiner

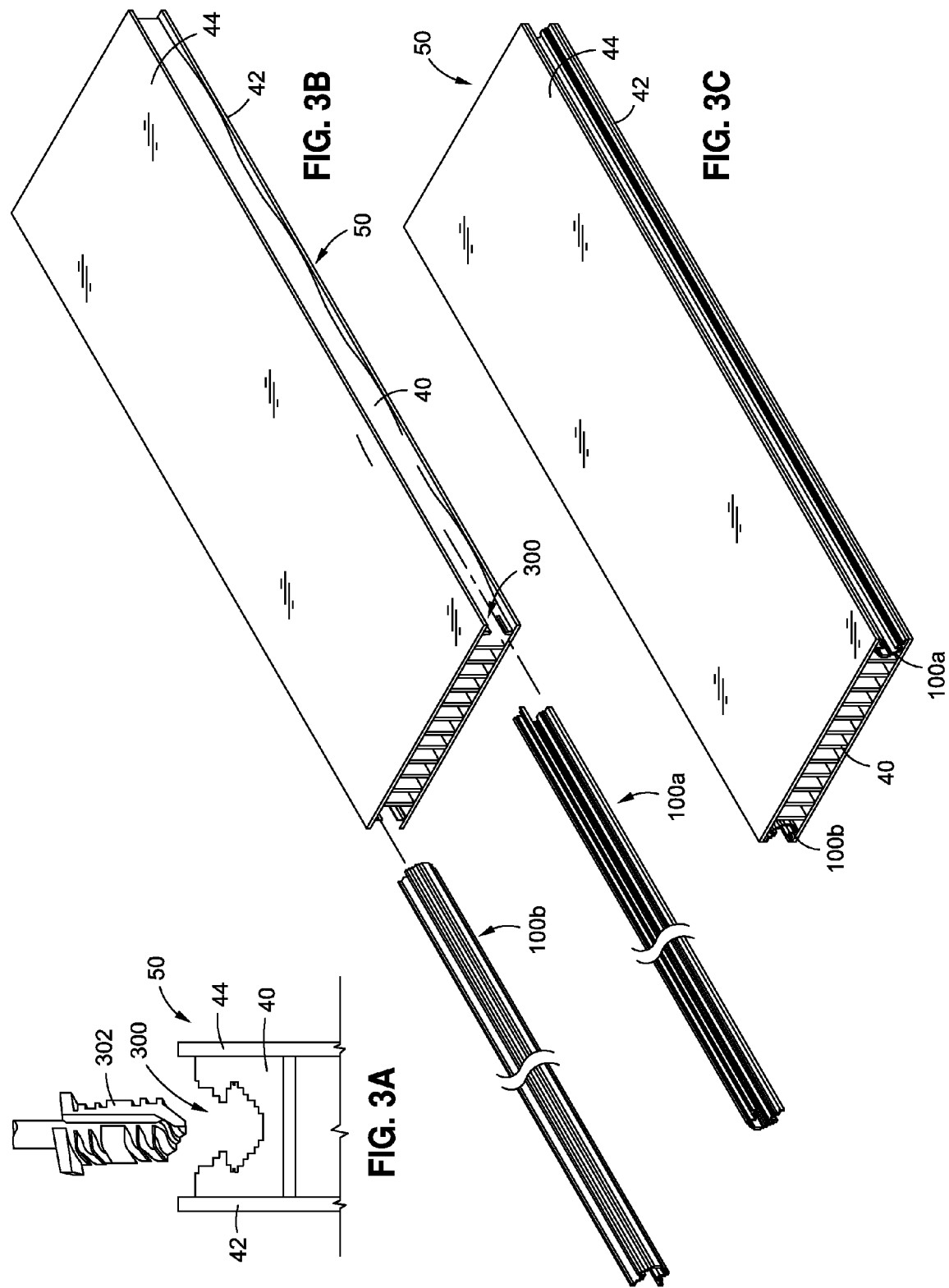

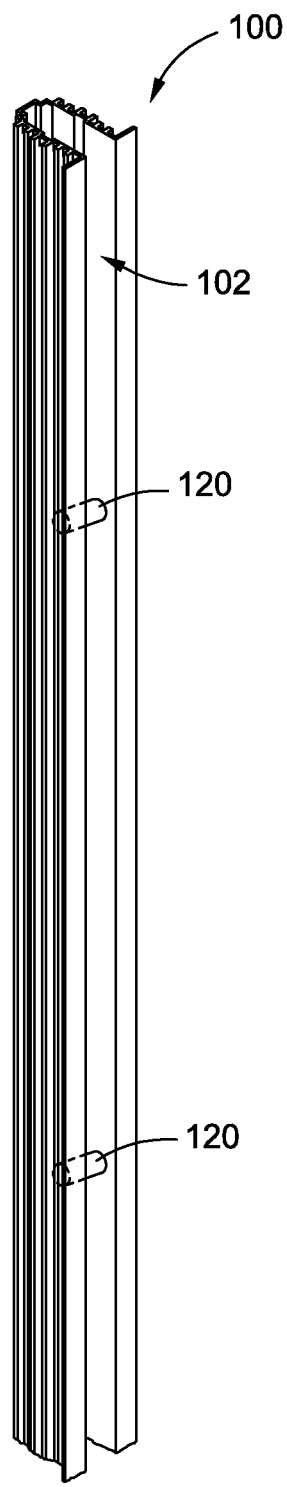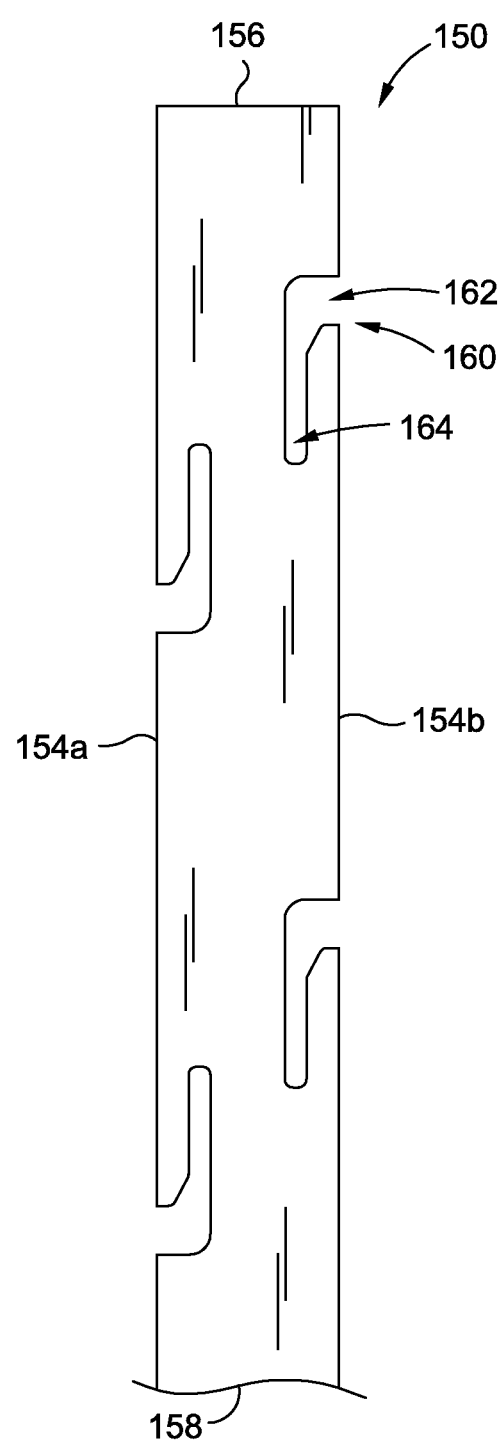
FIG. 4  FIG. 5

METHOD AND SYSTEM FOR INTERCONNECTING STRUCTURAL PANELS

RELATED APPLICATION DATA

This application is a continuation-in-part of U.S. patent application Ser. No. 12/590,352, filed Nov. 5, 2009 now U.S. Pat. No. 8,322,104, which is a continuation-in-part of U.S. patent application Ser. No. 12/584,165, filed Aug. 31, 2009, now U.S. Pat. No. 8,252,137.

FIELD OF THE INVENTION

This invention relates to methods and systems for connecting structural or building panels.

BACKGROUND OF THE INVENTION

Building panels have a wide variety of configurations. For example, some building panels may comprise solid plywood or particle wood board. These panels are heavy and utilize a substantial volume of material. In addition, such panels are often not very flexible, especially in the case of particle board.

Various attempts have been made to construct other panels which are stronger and lighter in weight. For example, some panels have been constructed from metal. These panels, however, are very expensive both because of the cost of the base materials and the production costs. They are also generally very strong, but not very light.

Some other panels have been developed which are fairly light, but such panels then not very strong, to the point that they will not support connected fasteners (such as screws which are used to mount items to the panel). For example, some wood panels have been constructed with hollow cores or cores of light-weight material. For example, some panels are constructed by applying thin sheets of plywood to either side of a frame having an open center. In this configuration, the core or center of the panel is hollow. These panels are light-weight, but not very strong.

In order to increase the strength of these open-core type panels, foam may be sprayed into the interior or a paper honeycomb material may be located in the interior. However, these panels have a number of other drawbacks. For example, these panels must be pre-constructed in a particular size determined by the size of the frame. Once such a panel is constructed, it is not possible to change the size of the panel. For example, if such a panel is cut in half, the cut severs the supporting frame, causing one or more sides of the cut panels to have no structural integrity.

An improved panel which is light-weight, strong, and inexpensive, is desired.

Another problem involves connecting building or structural panels. It is commonly desired to couple multiple panels together to form walls, floors and the like. For example, at a tradeshow or a convention a number of panels may be connected to form a temporary wall to define a booth. An advantage of using pre-constructed panels is that large structures can be formed from a number of individual panels, each of which is relatively easy to move and store. In addition, such structures can be formed in a non-permanent fashion, permitting the structure to be easily disassembled.

However, such structures must still be stable. In the case of panels which are used to form walls, the panels are generally placed upright and aligned side-to-side. Because the panels are very thin, however, they are not self-supporting in the vertical position. The panels may be connected to one another in a manner in which they maintain their desired position and form the desired structure. For example, panels might be connected with straps connected to the panels with connectors. This has the disadvantage that the straps may be visible and the fasteners may damage the panels, preventing them from being reused. Other means of connection include rotary locks embedded in the panels which can be rotated into engagement with a matting panel. Such locks are effective, but are costly and have a high installation cost. In addition, existing cooperative locking members require that a female locking body be installed in one panel and that a mating male locking body be installed in another panel so that the two locking members can be engaged. However, so configured, only "male" panels can be used with "female" panels. For example, a user might travel to a location and realize that they have 3 panels all fitted with female locking members. These panels cannot be connected to one another. As another example, an existing panel configuration may result in a "male" panel at one end of an assembly. The user can only connect a "female" panel to that "male" panel in order to extend the assembly. If the user does not have a "female" panel, the user can not complete the assembly.

Thus, an improved method and system for connecting panels is also desired.

SUMMARY OF THE INVENTION

One aspect of the invention is a method and system for joining building or structural panels. In one embodiment, the system comprises an anchor which is configured to be associated with a panel, such as at a face or edge thereof, and a connector configured to mount or connect to the anchor.

In one embodiment, the anchor may comprise a body which defines a trough and has at least one mount extending into or spanning the trough. In another embodiment, the anchor may comprise a body which defines slots there through and associated mounts, which anchors are configured to be located in a slot defined by the panel.

The connector comprises a body which is configured to engage two or more panels. In one embodiment, the connector may be configured to directly engage or mount to an anchor of a panel. Alternatively, or in addition, the connector may be configured to indirectly mount or engage a panel, such as by passing through slots in a panel.

In one embodiment, a connector defines one or more portions, such as projections, which are configured to pass through slots or openings in an anchor. When the connector and anchor are moved linearly relative to one another, the mounts of the anchor move into corresponding slots defined by the connector and/or portions of the connector move behind portions of the anchor, whereby the connector and anchor are prevented from moving laterally (i.e. being moved apart or separated).

The connector and the anchors may be sized so that when they are connected, the connector is located inside of the anchors. In this manner, the two connected panels may directly abut (rather than having a portion of the connector be exposed there between).

In an embodiment of a method, first and second panels are provided with anchors. The anchors are preferably located along edges of the panels. For example, the anchors may comprise elongate extrusions which are located in a slot formed in the edge of a panel. A connector is used to connect the panels. In particular, the connector is engaged with the mounts of the first and second anchors. So engaged, the panels are securely joined to one another.

Another aspect of the invention comprises a particular building panel and a method of making a building panel. The method and system for joining or connecting panels has particular applicability to such panels, but may be used with panels of other configuration.

In one embodiment, a panel comprises a structural core and a pair of outer skins or coverings. The core comprises a matrix of supporting members which surround or define voids or openings.

In a preferred embodiment, layers of building stock are connected to one another at specific locations. Each layer of building stock may comprise a thin layer of plywood. Each layer may comprise multiple pieces of building stock arranged end to end. Adhesive may be located at intervals along a length of the first layer of building stock. A second layer of building stock may then be connected to the first layer. This process may be repeated until a stack is formed of multiple layers of building stock. The stack is cut into strips. Each strip may be rotated and then expanded. When expanded, the individual layers of building stock separate in accordion fashion. Adjacent layers are selectively connected at one or more locations and separate from one another at other locations to define openings or voids.

The core may be located between skins or coverings. The skins might comprise, for example, plywood sheets or lauan panels. The skins may be connected to the core with adhesive.

The resulting panel is closed on each side or face by the skins. The skins are supported by the structural core. The panel is strong and lightweight, owing to the hollow configuration of the core and the intertwined or interlaced structural members of the core. The panel may be cut without jeopardizing the structural integrity of the core because of the unitary natural of the core.

In one embodiment, anchors or other elements may be associated with a panel. A slot may be formed in the panel, such as in an edge thereof.

In one embodiment, an elongate extruded anchor may be inserted into the slot. The anchor may define a trough or slot which is spanned by one or more mounts, such as pins. The anchor may be used to protect the edge of the panel and to mount the panel to other panels or other structures. In another embodiment, an anchor which defines a plurality of slots and associated mounts may be located in a slot in a panel, such as a T shaped slot.

Further objects, features, and advantages of the present invention over the prior art will become apparent from the detailed description of the drawings which follows, when considered with the attached figures.

DESCRIPTION OF THE DRAWINGS

FIG. 3A illustrates a step of cutting an anchor slot into a panel;

FIG. 3B illustrates placement of an anchor into an anchor slot in a panel;

FIG. 3C illustrates a panel including a panel anchor;

FIG. 4 illustrates an anchor including connector mounts in accordance with an embodiment of the invention;

FIG. 5 illustrates a panel connector in accordance with an embodiment of the invention;

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a building panel. As will become apparent later, such panels may be used for a variety of purposes. The uses of such panels are not intended to limit the scope of the invention herein. For example, the panels of the invention may be used to form walls or floors, or be used as doors, dividers or for other purposes.

In general, the panel of the invention has a core and a pair of opposing outer skins. The core preferably emulates a plant-like structure, having a number of structural elements and open spaces or voids. Other aspects of the invention comprise methods of making such panels, connectors for such panels, and methods of connecting panels.

One configuration of a panel of the invention will best be understood from a method of making a panel in accordance with a preferred embodiment of the invention. Referring to FIG. 1, a first row or layer 22 of building stock or material is provided. In a preferred embodiment, the building stock comprises plywood. Preferably, the building stock is generally planar, such as plywood having a thickness of 3 mm, 6 mm or 9 mm. In one embodiment, the first layer 22 of building stock is configured with set dimensions. For example, the first layer 22 of building stock may be 48 inches wide. In order to arrange the building stock in this configuration, it may be cut from base stock. For example, 48 inch by 48 inch plywood squares may be cut from base plywood sheets that are 48 inches wide by 96 inches long.

Figure 1A:
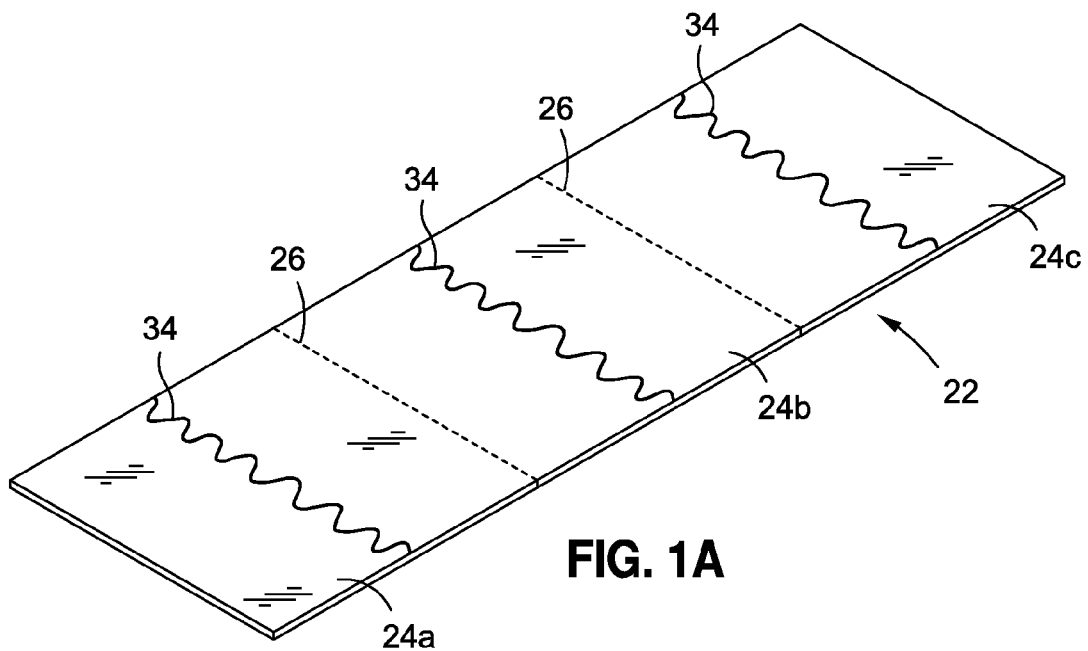
FIG. 1A illustrates a first layer of building stock used to form a panel of the invention.

FIG. 1A illustrates a configuration in which the first layer 22 is formed from a plurality of individual building stock pieces 24a,b,c. As illustrated, each piece 24a,b,c has dimensions of 48 inches by 48 inches. The pieces 24a,b,c are arranged into a row which is 48 inches wide by 144 inches long. In such a configuration, the pieces 24a,b,c are arranged end-to-end, with seams 26 at their intersections. Preferably, the pieces 24a,b,c are arranged so that their vertical grains align or extend parallel to one another. Of course, depending upon the desired length of the panel to be created, the layers of building stock might comprise singular elements.

Figure 1B:
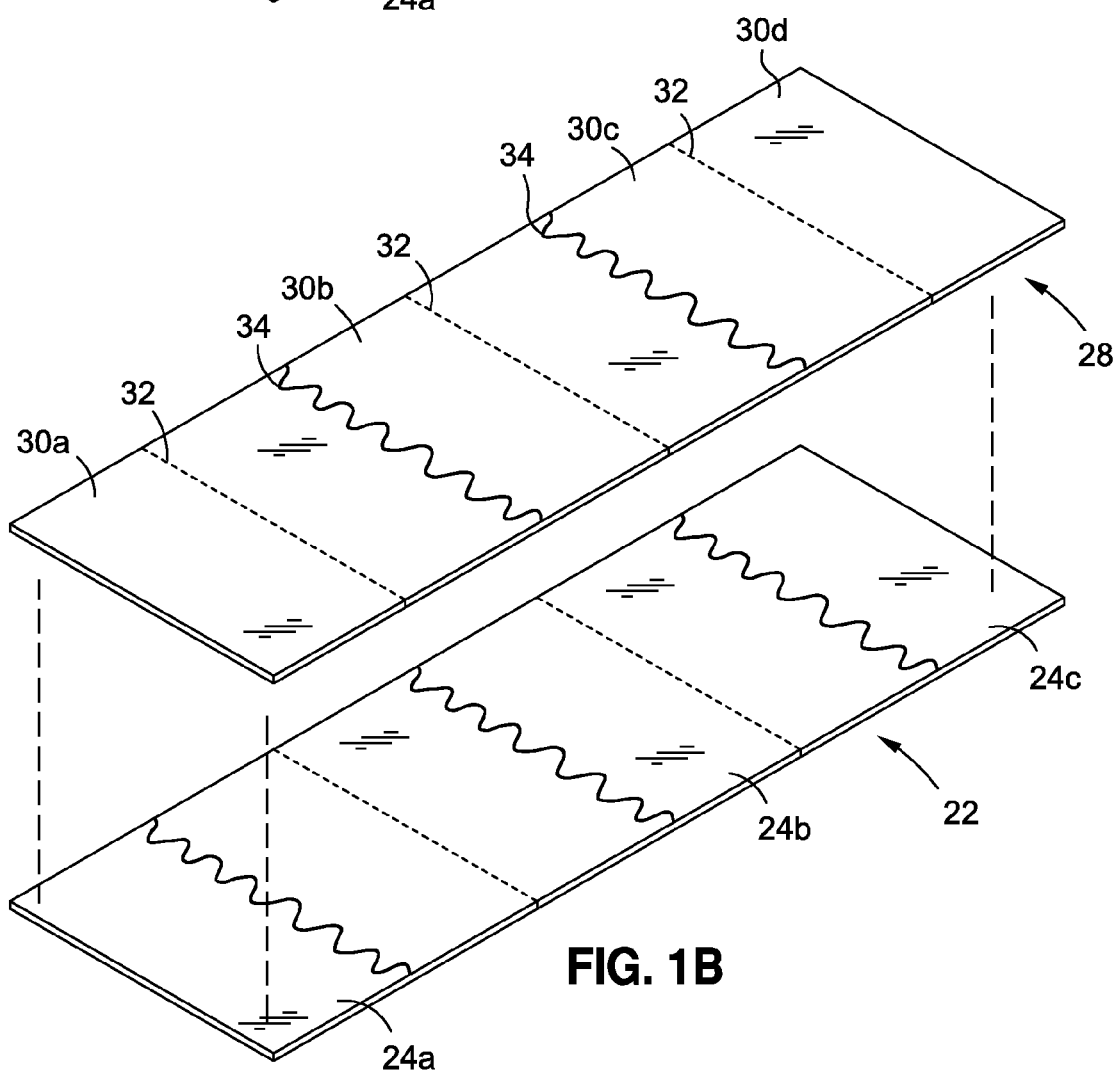
FIG. 1B illustrates first and second layers of building stock being connected to one another.

Referring to FIG. 1B, a second layer 28 of building stock is placed on the first layer 22. Preferably, the second layer 28 is similar to the first layer 22. For example, the second layer 24 may be defined by a plurality of pieces 30a,b,c,d of thin plywood stock. So that seams 32 between the individual pieces forming the second layer 28 do not overlap with the seams 26 of the first layer 22, they may be offset. This may be accomplished by starting the second layer 24 with a shorter piece 30a, such as a piece which is only 24 inches long. Of course, if the layers comprise singular elements of building stock, no offset is necessary.

Referring to both FIGS. 1A and 1B, the second layer 28 is connected to the first layer 22. In one embodiment, adhesive is utilized to connect the layers of material. In a preferred embodiment, the layers are connected at defined intervals. Referring to FIG. 1A, adhesive 34 may be applied across the width of each piece 24a,b,c at each end of the layer and at the midpoint of each piece 24a,b,c. Thus, when the pieces are 48 inches long, this means that the adhesive 28 is applied at 24 inch intervals, and the second layer 28 will thus be connected to the first layer 22 at such intervals. Of course, the layers 22,24 may be connected at other intervals. As one example, if the first layer 24 is 96 inches long, in one embodiment adhesive would be applied in 5 locations (at the ends and 3 locations spaced 24 inches apart there between). In one embodiment, the adhesive 34 is applied in a double line or strip at each location. The adhesive 34 might comprise a exterior amphelic resin glue, preferably having an open working time of about 2 hours or more.

Figure 1C:
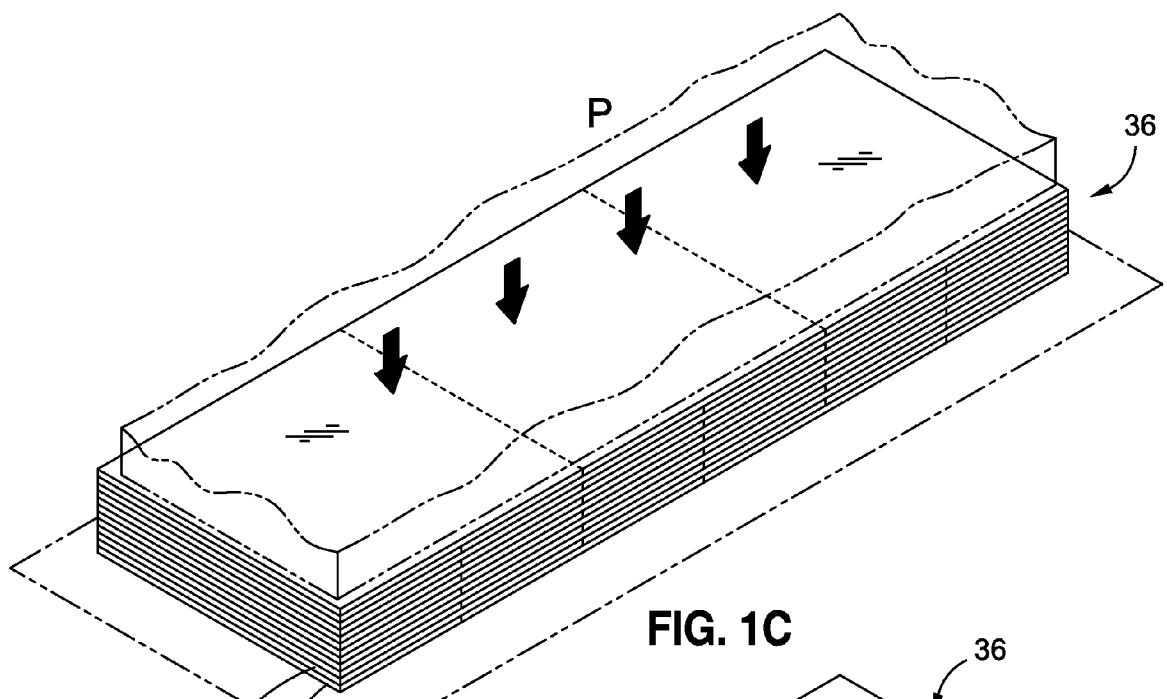
FIG. 1C illustrates a stack formed from a plurality of layers of connected building stock.

As illustrated in FIG. 1B, adhesive 34 may similarly be applied to the second layer 24 for connecting a third layer (not shown). The third layer may be configured so that any seams between pieces forming that layer are again offset from the seams of the second layer and so that the adhesive joins are offset from those of the first layer. This process may be repeated until, as illustrated in FIG. 1C, a stack 36 is formed. This stack 36 comprises a plurality of individual layers of building material, those layers connected to one another at defined locations. Preferably, the stack 36 is formed from multiple layers of building material. For example, the stack 36 might comprise as many as 20 or more layers (there could be a lesser number of layers, or even as many as 50 to 75 or more layers).

As illustrated in FIG. 1C, the stack 36 may be located in a press P which compresses the rows or layers of material for a period of time which allows the adhesive to set or bond. This ensures that the rows or layers of materials are securely joined. In one embodiment, the stack 36 is compressed at 90 pounds per square inch for 8 to 12 hours.

Figure 1D:
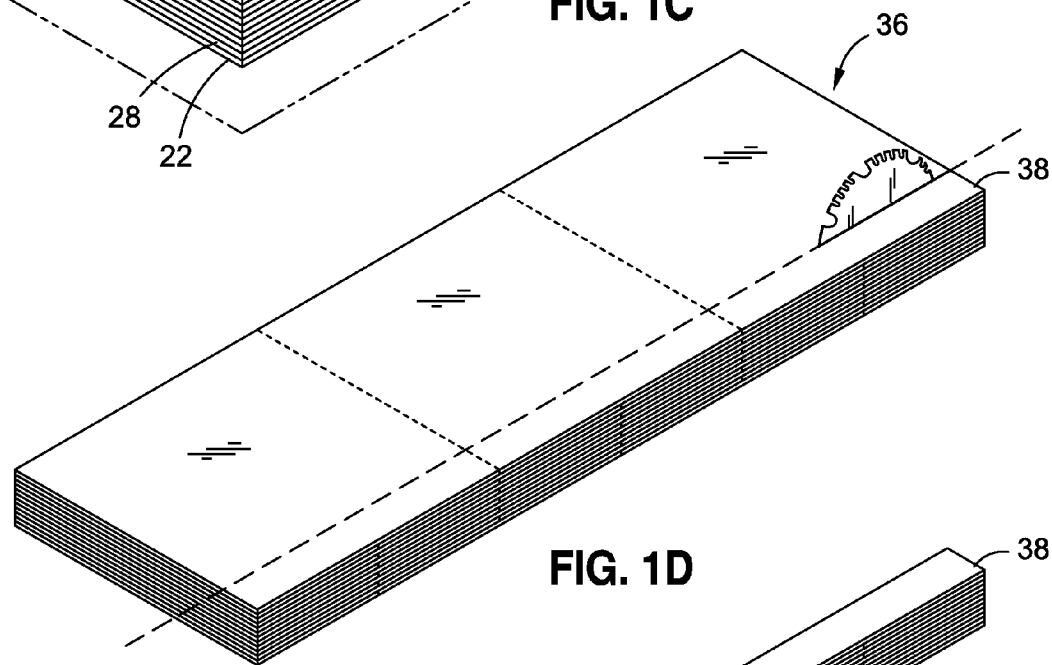
FIG. 1D illustrates the stack of FIG. 1C being cut into a plurality of strips.
Figure 1E:
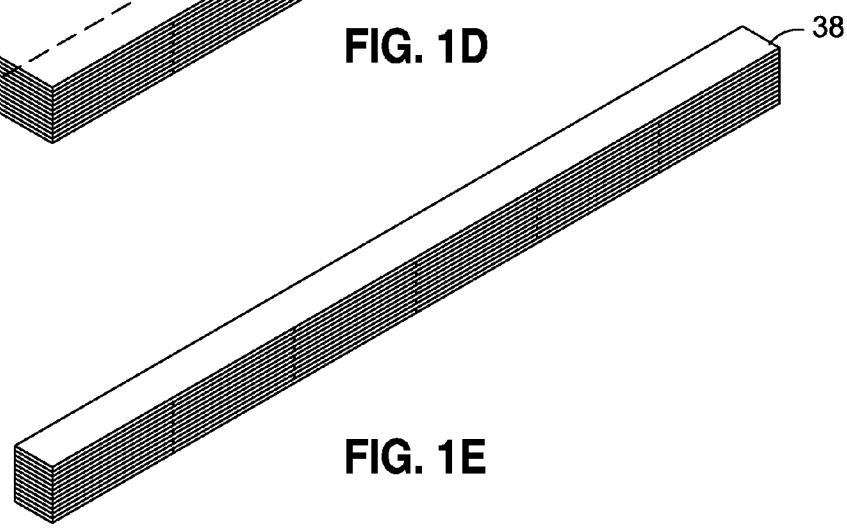
FIG. 1E illustrates one of the strips cut from the stack illustrated in FIG. 1D.

As illustrated in FIG. 1D, the stack 36 is then cut into strips 38, a single of which is illustrated in FIG. 1E. The strips 38 may have various widths. In one embodiment, the strips 38 are about 2 inches wide. In a configuration in which the stack 36 is 48 inches wide, about 22 strips may be created from the stack 36 (some loss owing to cutting of the stack). The stack 36 may be cut in various fashions. As illustrated, in one embodiment, the stack 36 may be cut using a table saw.

Figure 1F:
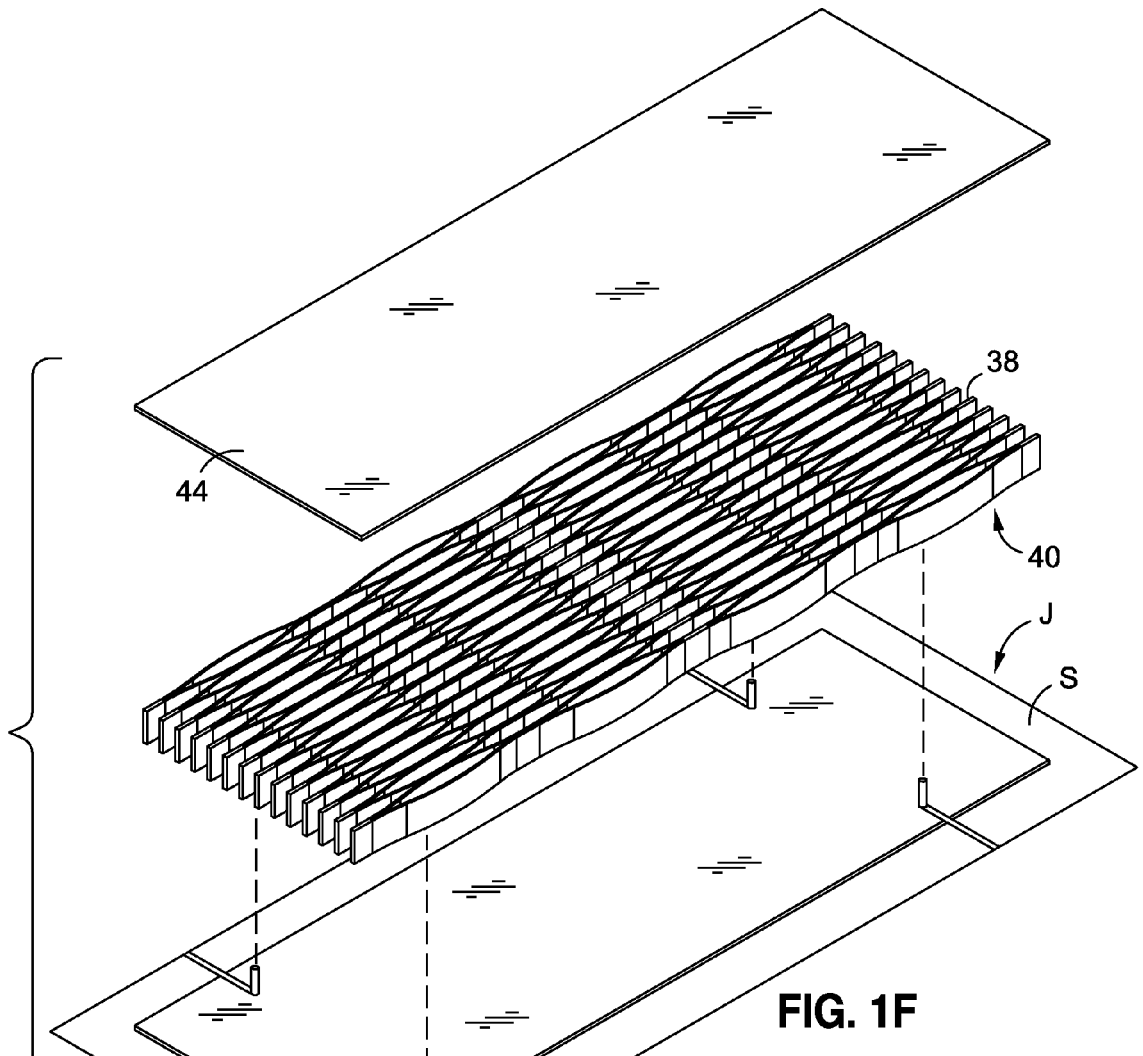
FIG. 1F illustrates the strip of FIG. 1F being expanded into a core on a jig and located between top and bottom skins to form a panel of the invention.

Referring to FIG. 1F, each strip 38 may then be expanded. As illustrated, the strip 38 may be rotated 90 degrees so that the layers of material forming the strip 38 are oriented vertically, rather than horizontally. The strip 38 may then be expanded in accordion-like fashion. As illustrated, the individual layers 22,28 of material are selectively joined at certain locations (at adhesive points) and free from one another at other locations (the areas between the adhesive joins), the expanded strip thus forming a pattern or grid structure having openings or voids 40 therein.

As illustrated in FIG. 1F, the strip 38 may be expanded on a table or jig J. The jig J may comprise a planar support S having a plurality of positionable anchors or catches C. The catches C may comprise, for example, metal pins. The strip 38 may then be connected to the catches C at one side of the jig J and then pulled and expanded until it reaches the other side of the jig J, where it is connected to the catches C to maintain the strip 38 in an expanded position. The catches C are preferably arranged to maintain the strip 38 in an expanded position of a desired size. For example, the strip 38 may be expanded so that it is 48 inches wide (the length of the strip 38 does not change substantially between its expanded and unexpanded states, and is primarily governed by the length of the stack 36 as constructed from the layers of building stock).

In its expanded state, the strip 38 comprises a core 40 for the panel of the invention. Additional details and aspects of the core 40 will be described in more detail below.

Figure 1G:
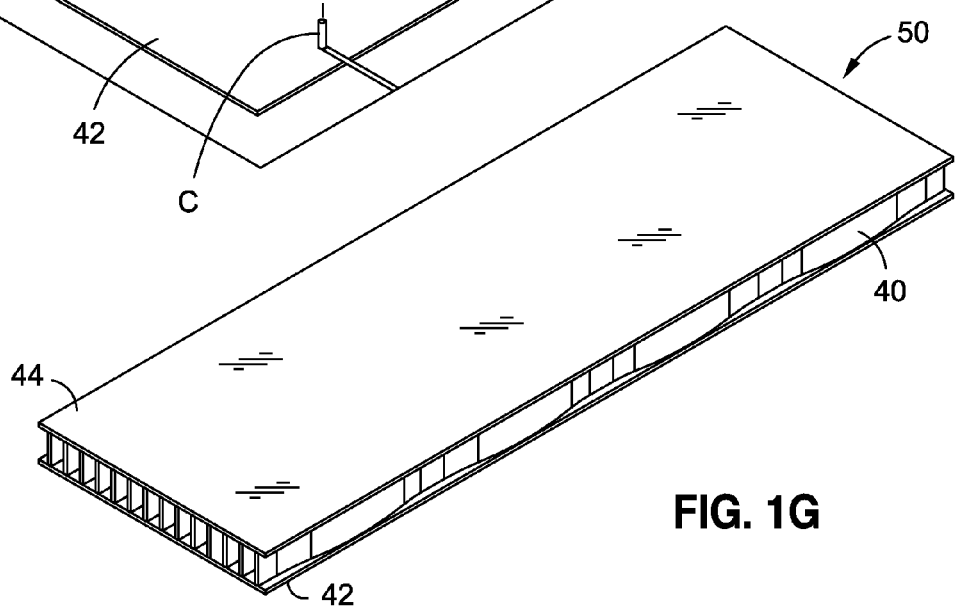
FIG. 1G illustrates a panel of the invention comprising a core located between a pair of skins.

As illustrated in FIG. 1G, exterior members, coverings or skins are preferably applied to opposing sides of the core 40. In one embodiment, the skins are connected to the core 40 with adhesive. Adhesive is applied to opposing sides of the core 40. The adhesive may be applied to the expanded core 40, but is more easily applied to the strip 38 before it is expanded. In one embodiment, the adhesive is Reac Tite 8143 (a single part moisture activated polyurethane) available from Franklin Glue or Utilithane 1600 (a two part polyurethane) by Prime Coatings, Inc.

Once the adhesive is applied, a first skin 42 may be applied to a first side of the core 40, and a second skin 44 may be applied to the opposing second side of the core 40. In one embodiment, the first skin 42 may be located on the jig J, as illustrated in FIG. 1F. The strip 38 may then be located over the first skin 42. The catches C are moved into position and the strip 38 is connected to the catches C at one side of the jig J. The strip 38 is then expanded and held in position using the catches C at the opposing side of the jig J. The second skin 44 may then be applied over the expanded core 40.

The skins 42,44 may comprise a variety of materials. For example, the skins 42,44 might comprise thin plywood sheeting such as a lauan panel, a high pressure laminate (such as FORMICA®, a registered trademark of Formica Corporation), an oriented strand board (OSB), plastic or PVC sheeting, aluminum or other metal, or other material. The skins 42,44 might have one or more finished surfaces, such as an outer surface which is stained, painted or the like.

After the skins 38 are attached, the assembly may be located in a press. The assembly of skins 42,44 and the core 40 may, for example, be held under 90 psi for 18 minutes, to allow the adhesive to set. The assembly may then be removed from the pressed and allowed to cure, such as for a minimum of 4 hours. The assembly may be trimmed square, such as using a double edge tenor or a CNC router.

The skins 42,44 preferably have a peripheral size which is substantially the same as the core 40. Thus, the length of the skins 42,44 is approximately the same as the length of the core 40, and the width of the skins 42,44 is approximately the same as the width of the core 40.

Once the skins 42,44 are connected to the core 40, the combination thereof comprises a panel 50. FIG. 1G illustrates the assembled panel 50. A number of aspects of the panel 50 of the invention will now be appreciated. In one embodiment, the panel 50 comprises a pair of skins 42,44 or coverings and an interior core 40. The skins 42,44 or coverings define opposing sides or faces of the panel 50. The thickness of the panel is determined by the thickness of each skin and the thickness of the core 40. The panel 50 has a periphery. When the panel 50 is quadrilateral in shape, it has four sides and thus four corresponding edges. As illustrated, the edges are generally defined by the core 40. At opposing ends of the panel 50, the connected and unconnected portions of the layers of building stock which form the core are exposed. At opposing side edges, the exterior-most layer of building stock forming the core is visible. This exterior-most member undulates in and out towards the edge of the panel 50 based upon the accordion configuration of the core 40.

For example, the panel 50 may be about 48 inches wide, 96 inches tall, and about 2.5 inches thick (depth). In that configuration, the skins 42,44 and the core 40 all have a width of about 48 inches and a height of about 96 inches. The core 40 may be 2 inches thick and the skins 42,44 may each be about 0.25 inches thick.

The core has a number of important features. First, the core comprises a plurality of elongate members. These members comprise strip portions of the layers of building stock which were used to form the stack. Importantly, the elongate members are connected to one another in one or more locations, thus comprising a matrix or grid structure. In addition, the core comprises openings or voids defined between the elongate members. These openings or voids lessen the mass of the core. Relative to the expanded size of the core 40, the openings or voids may comprise a substantial volume of the space occupied by the core.

In a preferred embodiment, the structure of the core results in panel of substantial strength. First, the elongate members run the length of the panel from one end to another. In this manner, the members, and thus the core, provide end to end strength for the panel. The elongate members, comprising strips of plywood or a similar material, also resist compression. Thus, the core prevents the skins from being compressed towards one another. Lastly, the elongate members are connected to one another across the width of the panel. In this manner, the core provided side-to-side strength of the panel. In addition, the skins add to the strength of the panel.

Advantageously, the panels of the invention may be cut into various shapes and sizes. The panels of the invention may also be connected to one another or other members or structures.

First, the panels may be cut. For example, a panel may be cut in half along its width or along its length. Importantly, regardless of how the panel is cut, the strength and integrity of the divided portions of the panel are maintained. This is because the core still remains in tact in each divided portion of the panel. Thus, as to each divided portion of the panel, some part of the grid of elongate members which forms the core exists therein, including along the newly formed edges of the divided panel portions. This is unlike prior panel designs in which covers were located over a perimeter frame. In that prior art configuration if a panel was cut width-wise or length-wise, the portions of the panel along the cut edge would have no structural integrity because there would no longer be a supporting frame element along that cut edge. An advantage of this aspect of the invention is that the panel can be re-sized at a job site. As indicated, in the prior art, a panel had to be custom-configured during manufacture. If the panel is shipped to a job and is the wrong size, the process must begin again with the manufacture of a new panel. However, in accordance with the present invention, a panel can be manufactured in a generic size and shipped to a job. The user can then cut the panel to any desired size for use in various applications. In addition, a panel can be cut into a plurality of sub-panels, thus creating multiple panels.

A substantial advantage of the invention is that the configuration of each panel core can be changed without changing the method of manufacture of the core. In particular, the extent to which a core is expanded can be used to adjust the strength of the core and the density or weight of the core. For example, a single stack might produce 10 strips. A first strip might be expanded so that it is 48 inches in width. A second strip might be expanded so that it is 96 inches in width. If both cores are used with skins that are 48 inches in width, the second core will be cut in half. The first core will then have twice as many supporting members than the second core, and likewise the second core will have twice as much void or open space therein. Thus, the first core will have a higher density and strength, but greater weight that the second core, and likewise the second core will be less strong but be much lighter than the first core. These two cores might be used in different applications where factors of weight or strength have different levels of importance. In both cases, however, the strips forming the core could be cut from the same stack.

In a preferred embodiment of the invention, the core of the panel has a structure which is similar to or emulates the xylem structure of a plant. In particular, the core has elongate structural members or fibers defining or surrounding voids or openings. In one embodiment, those openings are ogive-shaped. This structure allows the core to be load bearing in both the vertical (top to bottom) and horizontal (side to side) direction.

Figure 2A:
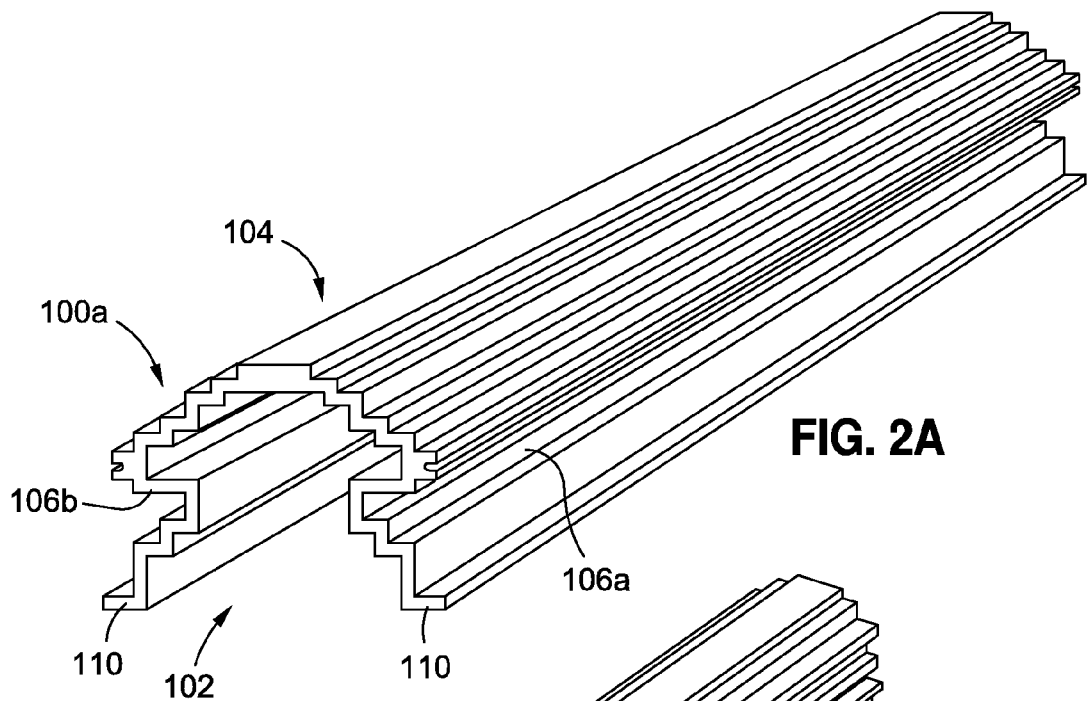
FIG. 2A illustrates a panel anchor in accordance with an embodiment of the invention.
Figure 2B:
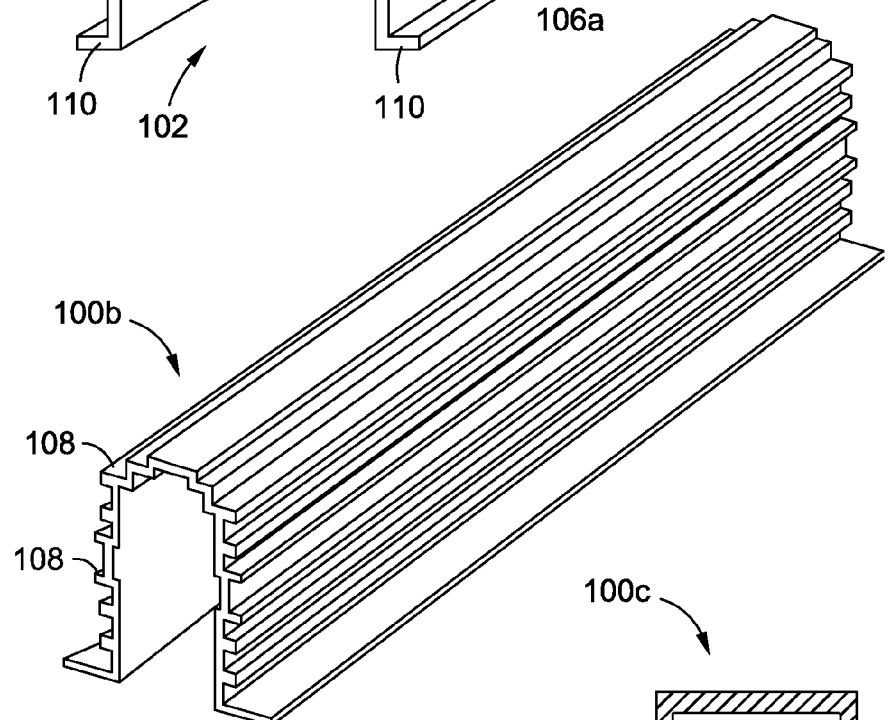
FIG. 2B illustrates another embodiment of a panel anchor.
Figure 2C:
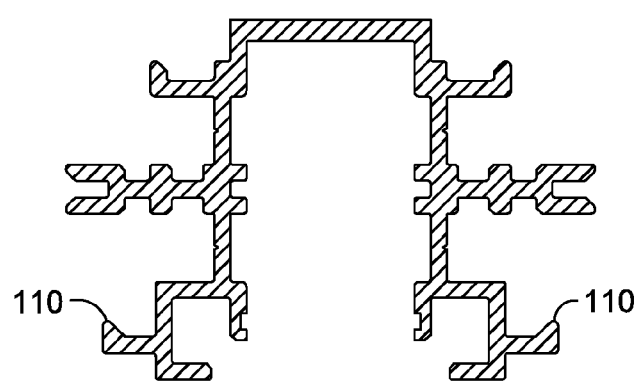
FIG. 2C illustrates yet another embodiment of a panel anchor.

The panels may be connected to one another and/or other members. One aspect of the invention comprises panel anchors 100 and methods of anchoring panels. FIGS. 2A-2C illustrate various different anchors. As illustrated in FIG. 2A, one anchor 100a may comprise an elongate extruded metal (such as aluminum) member. In one embodiment, the anchor 100a has a top 102 and a bottom 104. The top 102 may be generally open, while the bottom 104 is generally closed. A pair of sides 106a,b, extend from the bottom 104 towards the top 102. In this configuration, the anchor 100a has the shape of a trough.

In the embodiment illustrated, the bottom 104 of the anchor 100a is generally planar. The sides 106,a,b may comprise walls. The sides or walls 106a,b, preferably define a plurality of steps or protrusions. One or more of the portions of the walls 106a,b may extend back towards a center of the anchor 100a. As detailed below, the configuration of the walls 106a,b is preferably selected to prevent rotation of the anchor 100a when it is placed in a panel 50.

Each side or wall 106a,b defines an outwardly extending flange 110 at the top 102 of the anchor 100a. Each flange 110 preferably comprises a generally planar area.

FIG. 2B illustrates another embodiment of an anchor 100b. This anchor 100b may comprise a plastic extrusion. The anchor 100b may again have a bottom and a top and a pair of walls. In this configuration, the walls may be generally vertical. To prevent rotation of the anchor 100b, a plurality of fins 108 may extend outwardly from the walls.

FIG. 2C illustrates another embodiment of an anchor 100c. This anchor 100c also comprises an extrusion. The anchor 100c again has a bottom and a top and a pair of walls. Also, a number of flanges or extensions 110 extend outwardly from a main body of the anchor 100c for use in securing the anchor 100c, such as to prevent its rotation.

As illustrated, anchors 100 of the invention may include various surfaces or extensions which are configured to accept one or more fasteners. These fasteners may be used to secure the anchor to a panel. For example, while the anchor 100 may be configured to slide into a channel or slot and can not be removed laterally from the channel, the fasteners may be used to prevent the anchor from sliding back out of the channel longitudinally.

It will be appreciated that the anchor 100 of the invention may have other configurations.

A method of installing an anchor will be described with reference to FIGS. 3A-3C. As illustrated in FIG. 3A, in one embodiment, a slot 300 is formed in the edge of a panel 50. Notably, because of the strength and rigidity of the core 40 of the panel 50, an anchor can be installed along any edge. For example, an anchor may be installed along a side of a panel 50 (i.e. parallel to the direction that the elongate members of the core 40 extend) or along an end of a panel 50 (i.e. across the width of the core 40). FIG. 3A illustrates one embodiment of the method in which a slot or channel 300 is formed in the core 50 along one side of the panel 50.

As illustrated, the slot 300 may be formed by passing a cutter 302 along the side of the panel 50. The cutter 302 preferably has a profile which matches the anchor to be installed. For example, the cutter 302 may be a rotary bit, such as a router bit. The cutter 302 passes through the core 40 along its length adjacent the side of the panel 50.

As illustrated in FIG. 3B, a corresponding anchor 100 may be located in the slot 300, such as by sliding the elongate anchor 100 into the slot 300. This sliding engagement has the advantage that it allows very quick installation of the anchor. Further, because the slot 300 and anchor 100 are formed with inter-engaging members, the anchor 100 is self-centering or aligning, again allowing it to be quickly and easily installed.

In a preferred embodiment, the slot or channel 300 includes protrusions which extend into the slot. These protrusions preferably engage the anchor 100, such as between flanges of the anchor. This inter-engagement, similar to a tongue and groove or similar locking configuration, secures the anchor to the panel along the length of the anchor. This provides greater mounting strength than, for example, merely gluing or connecting a member to the panel with individual fasteners.

Referring to FIG. 3C, once the anchor 100 is placed, the flanges 110 at the top 102 thereof protect the surrounding portions of the panel 50. The anchor 100 is also prevented from rotating within the slot 300 or from being pulled outwardly from the slot 300 because the protruding portions thereof are located in corresponding cut-out areas of the slot 300. As indicated above, one or more fasteners, adhesive or the like may be used to prevent the anchor from sliding longitudinally along the slot.

Notably, the anchor 100 extends along the length of the edge of the panel 50, thus protecting that edge of the panel from damage and also adding strength to the panel. In particular, the anchor 100 serves as an edge protector: the flanges and other portions of the anchor serve to protect the edge of the panel from damage. The anchor 100 also strengthens the panel 50 by extending along its outer edge, adding rigidity to the panel 50. In the configuration in which the anchor 100 is located in a slot 300 and engages the panel 50, the anchor 100 becomes an integral portion of the panel 50, rather than merely an element which is attached to or affixed to the outside of the panel and carried by the panel.

It is noted that the anchors 100 may be formed in elongate extrusions. Those extrusions may be cut to a length which matches the length of the edge of a panel 50 to which the anchor 100 is to be mounted.

As disclosed below, the anchor 100 may also be used to connect or mount the panel 50 to one another members.

It will be appreciated that anchors may be utilized which are not extruded and/or which do not extend the entire length of the edge or side of a panel. For example, short anchor members might be located at just the top and bottom portions of an edge of the panel (such that there is no anchor member in the center portion of the edge).

Because of the structure of the panel of the invention, it is also possible to utilize other types of anchors or mounts. For example, a "T" shaped slot may be routed or otherwise formed in the top or bottom skin 42,44 and adjacent core structure 40. A "T" shaped extrusion may be slipped into this slot and may be connected with adhesive or the like to the panel.

The panel of the invention also permits mounting of items to the skins 42,44. For example, a passage may be formed through the core 40 laterally to the mounting point. A dowel or peg may be placed into that passage for intersection with the mount which extends through the skin 42,44 into the core. The dowel or peg is supported by the structure of the core and thus provide substantial support for the mount which extends through the skin 42,44.

One advantage of the panel of the invention is that it ready permits formation of a structural slot or channel. This slot is capable of supporting an anchor or other element. The anchor may be used to connect the panel to another panel or other structure/member. The anchor may also be used as an edge protector.

The slot in the panel and/or the anchors may be used to mount an assortment of fasteners or connectors. One or more fasteners may be attached to the anchors and be located in the slot or trough thereof, such as one or more Norse locks or Simmons locks. The trough or slot of the anchor may also be designed to accept standard shelf support, T-slot brackets and similar off-readily available/off the shelf connectors and mounts. For example, the anchors may be configured to accept rotary type locks such as those shown in U.S. Pat. Nos. 5,480,117 and 5,601,266 to the inventor herein. Such fasteners or connectors may be used to connect one panel to another in a secure manner, thus enabling multiple individual panels to be joined into wall sections and other configurations, and/or permitting the panels to be connected to other members or structures.

A particular advantage of the invention is that the structural slot and anchor may be associated with a panel after the panel is manufactured, and even after a panel has been cut. In the prior art an anchor might be associated with a frame of a panel during the manufacture of the panel. However, if that prior art panel is cut, a portion of the frame and thus the associated anchor, may be severed from the panel, rendering it useless. However, the panel of the invention can be cut and a slot or channel can be formed in any portion or the panel at any time (either in an edge or even in a face or skin thereof, as detailed above). Thus, a panel can be cut and slots can be formed in the new edges of both new panel portions. Anchors can then be located in those slots, whereby custom configured panels with anchors can easily be formed at a job site.

Another aspect of the invention comprises a preferred method and system for connecting panels. Such a method and system have particular applicability to the panels described herein, but may be utilized relative to a wide range of panels other than those of the invention, such as prior art "frame" panels. As described above, there are particular advantages associated with connecting pre-constructed panels.

In one embodiment, a method and system of connecting panels comprises mounting anchors to panels and then using one or more connectors to connect the panels via the anchors. Referring to FIG. 4, in one embodiment, the anchors 100 comprise a channel or mounting member, such as described above. Such an anchor 100 is preferably securely mounted at an edge or side of the panel P. The anchor 100 may have configurations other than that described above.

Preferably, each anchor 100 includes one or more mounts 120. The mounts 120 are configured to accept or engage a connector. In one embodiment, the mounts 120 may comprise a pin, such as a pin which spans the trough 102 of the anchor 100. The mounts 120 might have other configurations, however, such as members which protrude from the anchors. The mounts 120 may have a uniform spacing or configuration for acceptance of a standardized connector, as detailed below. For example, the mounts 120 might be uniformly located 30 cm apart.

In one embodiment, a connector 150 is used to connect panels P outfitted with anchors. The connector 150 preferably comprises a body which is configured to engage one or more of the mounts 120 of the anchors 100 of the panels P and serves to connect the two panels.

One embodiment of a connector 150 is illustrated in detail in FIG. 5. In this embodiment, the connector 150 comprises a generally planar body 152. The body 152 has a front and a back and a pair of opposing sides 154a,b. The body 152 also has a top 156 and a bottom 158. The connector 150 might be constructed from wood or synthetic materials.

The connector 150 is configured to engage one or more mounts 120. In one embodiment, the connector 150 defines one or more slots 160. Each slot 160 preferably extends inwardly from one of the sides 154a,b of the body 152. Each slot 160 preferably defines an opening 162 located at one of the sides 154a,b of the body 152. Each slot 160 has a terminus or closed portion 164 defined in the body 152.

In a preferred embodiment, the first or opening 162 portion of each slot 160 extends generally laterally or transversely into the body 156 (i.e. towards the opposing side). The terminus or closed portion 164 is preferably defined by generally vertically or longitudinally extending portion of the slot (i.e. a portion which extends generally perpendicular to the opening portion and thus generally in the direction parallel to a line extending through the ends of the connector).

In a preferred embodiment, the longitudinal portions of the slots 160 at opposing sides 154a,b of the body 152 extend in opposing directions. In the example illustrated in FIG. 5, the slots 160 associated with the first side 154a have their longitudinal or terminating section 164 extending upwardly from the opening portion 162. On the other hand, the slots 160 associated with the second side 154b have their longitudinal or terminating section 164 extending downwardly (in the opposing direction). Of course, the orientation of the slots 160 at the opposing sides could be reversed from that illustrated.

Figure 6:
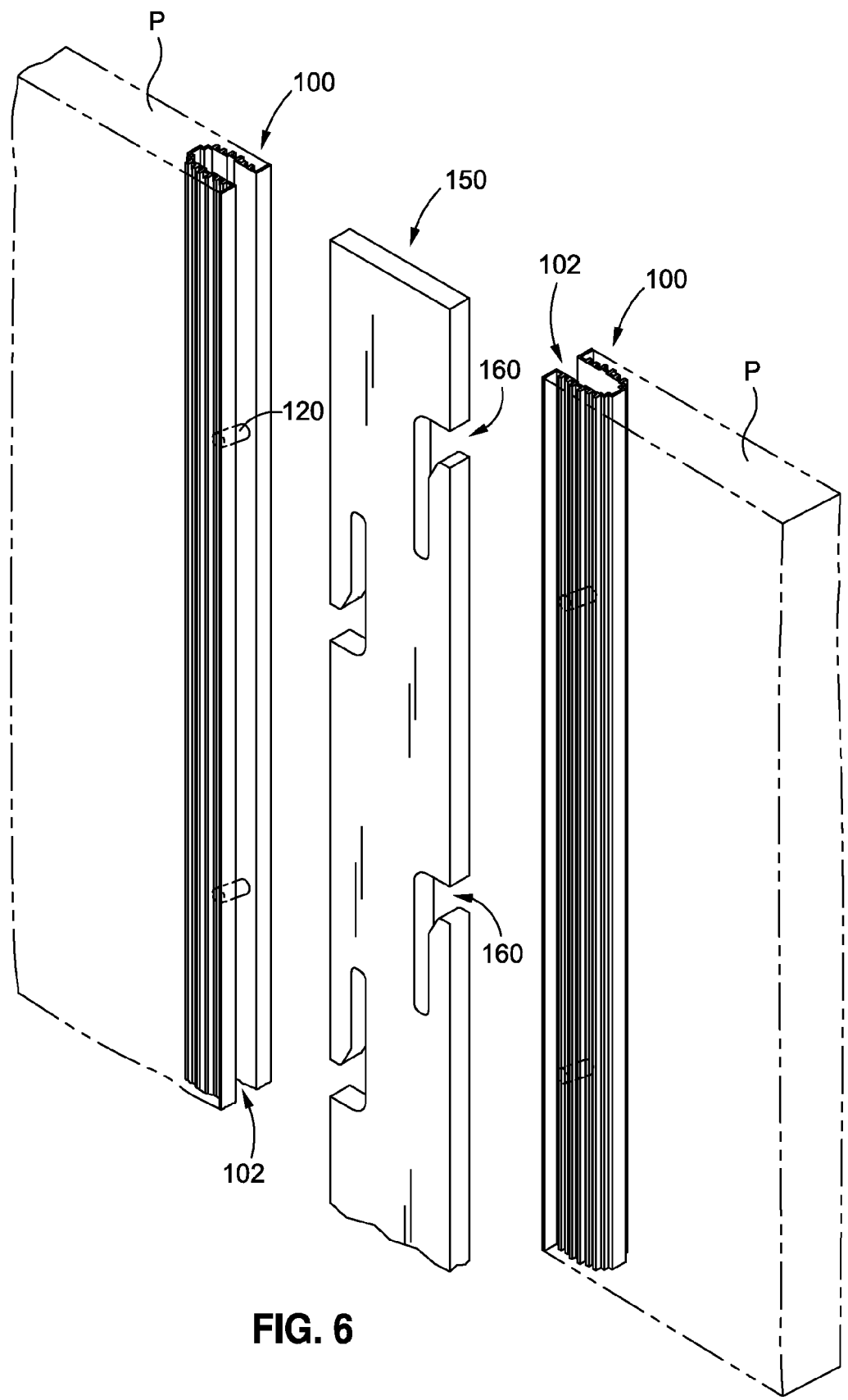
FIG. 6 illustrates the inter-relationship of a connector and two panels including anchors.
Figure 7:
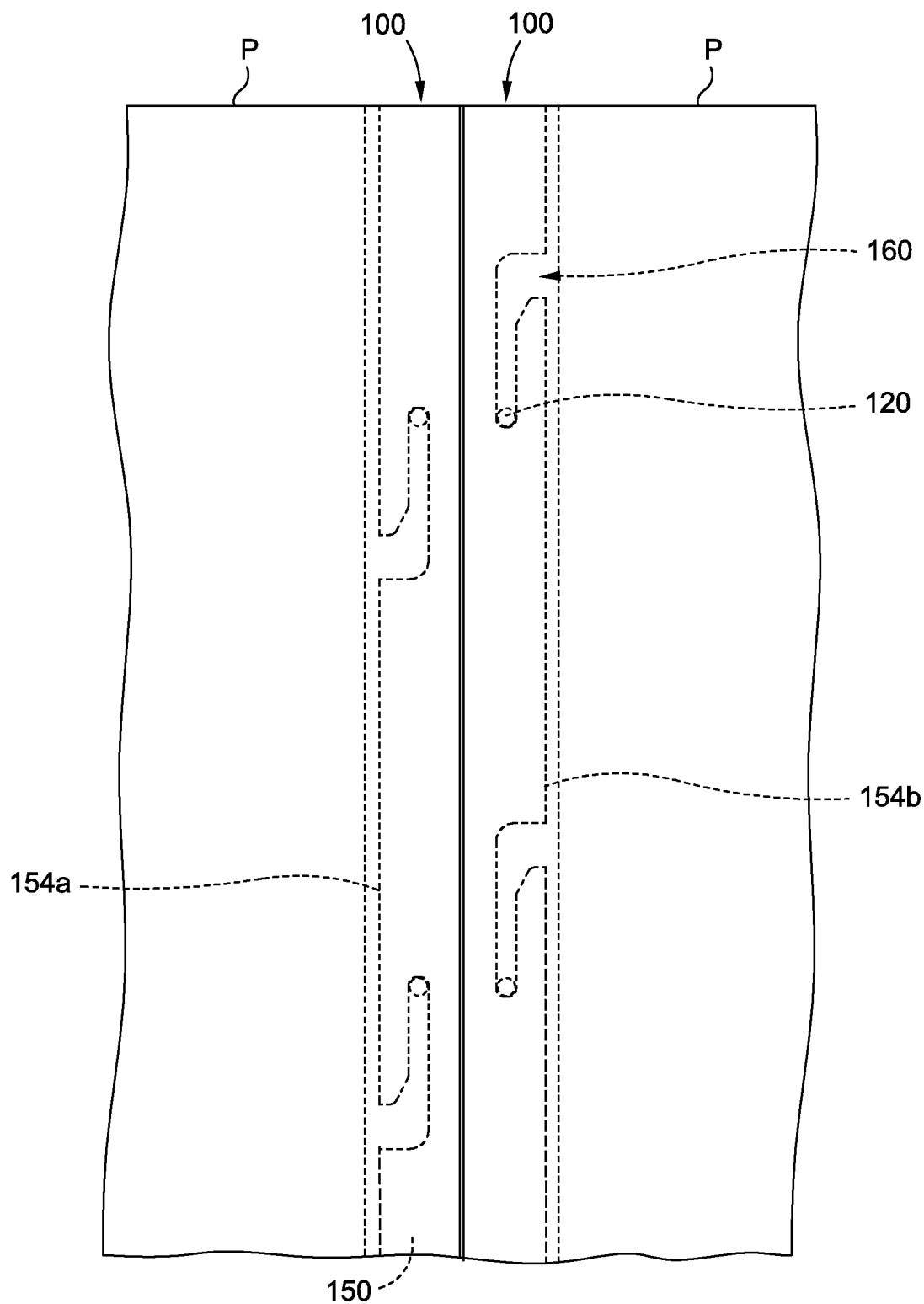
FIG. 7 illustrates two panels connected to one another using a connector and anchors in accordance with an embodiment of the invention.

Additional details of the anchors 100 and the connector 150 will be appreciated when considering FIGS. 6 and 7, which shows the manner of connecting two panels P. As illustrated therein, anchors 100 are associated with at least two edges of the panels P. Preferably, the anchors 100 are associated with at least edge of the panels P which are oriented towards one another when the panels are in their desired orientation. In this configuration the panels P are oriented to that edges having anchors 100 face one another, as illustrated in FIG. 6.

A connector 150 is used to connect the panels P. As illustrated, the connector 150 is located between the edges of the panels P being connected. The connector 150 is oriented so that one side 154a thereof faces one of the panels P and the other side 154b faces the other panel P.

The connector 150 is connected to the two anchors 100. As illustrated, the connector 150 is positioned so that the openings 162 of the slots 160 at one side 154a of the connector 150 are aligned with the mounts 120 of one of the anchors 100. The connector 150 and panel P can then be moved relative to one another so that the mounts 120 move into the longitudinal closed portions 162 of the slots 160. The same process is repeated relative to the slots 160 at the second side 154b of the connector 150 relative to the other panel.

As illustrated in FIG. 7, once the connector 150 is so positioned, it is located between and housed within the panels P. The edges of the panels P are positioned adjacent to one another with the connector 150 joining the panels P.

From FIG. 7 it will be appreciated that the configuration of the anchors 100, position of the mounts 120 and the shape and configuration of the connector 150 are all preferably selected to achieve a number of results. In a preferred embodiment, the anchors 100 and the connector 150 are sized so that the connector 150 fits within the anchors 100 when mounted thereto (i.e. so that the edges of the panels P abut when they are connected and the connector 150 is not exposed in a space between them). The mounts 120 and the slots 160 are positioned so that they align in mating configuration, as illustrated (it being appreciated that a misplaced anchor or slot would prevent mating thereof—as indicated, if the mounts 120 are located 30 cm apart, then the corresponding slots 160 are similarly spaced). The depth of the mounts 120 within the anchors 120 and the depth of the slots 160 are chosen so that the mounts 120 fit within the slots 160 when the connector 150 is accepted into the anchors 100.

It will be appreciated that two or more anchors could be associated with a panel. For example, while one single long anchor could be located at an edge of a panel, two or more shorter anchors could be associated with that edge. Similarly, one or more connectors could join to one or more anchors. In a preferred embodiment, a single long anchor is located at each panel edge (the anchor extending generally along the entire length of the panel) and the connector similarly extends along the entire length of the anchors of one or more panels.

It will also be appreciated that anchors 100 may be located along more than one edge of a panel P. For example, anchors 100 may be located at opposing edges of a panel or all four edges of a panel. So configured, panels P may be joined to other panels P in a variety of orientations. For example, panels P may be joined side-to-side to form a wall. However, the panels P might be connected in a grid, such as a matrix of n×m panels, such as to form a floor or a wall which is more than one panel in height.

The number of mounts 120 associated with an anchor 100 may vary. For example, an anchor 100 might have only one mount 120 or might have a plurality of mounts. Of course, the number of slots 160 a connector 150 has may be depend upon the number of mounts 120 it is to connect to. The slots 160 may taper or narrow at their terminus, thus causing the mounts to wedge or fit tightly in the slots 160 in their connected position.

This method and system for connecting panels has substantial benefits over known techniques. One aspect of the method and system is that it is configured so that the force of gravity locks the panels into their connected position. In this manner, the method of joining or connecting the panels may be referred to as a gravity mount or connection, with the connector referred to as a gravity cleat. As illustrated in FIG. 7, the configuration of the mounts and slots, including their inverse orientation at opposing sides of the connector, causes gravity to move the panels and connector into maximum locking position. In particular, the weight of the right-side panel P causes the panel (and thus associated mounts 120) to move to the bottom of the slots 160 at that side 154b of the connector 150). This, in turn, pulls the entire connector 150 down, causing the mounts 120 at the opposing side to be positioned at the tops of the slots 160 in the opposing side 154a of the connector 150. In this manner, maximum locking effect is realized between the panels P and the connector 150.

It will be appreciated that one or more mounts may be connected to a panel P separate from an extruded anchor. For example, during manufacture of a panel a slot or trough may be formed in an edge or other portion of the panel P. One or more mounts, such as pins, may then be connected to the panel such that they span the trough or slot, thus effectively creating an anchor for a connector as described above.

A particular advantage of the method and system is that the connector 150 can be installed and the connection can be accomplished without the need for tools. Once panels P are outfitted with anchors, they can be joined merely by orienting the panels and placing the connector(s) 150 between them. This greatly reduces the time and energy needed to connected and disconnect panels, and simplifies that process. Further, when the anchors and connectors are standardized in their configuration, various panels can be connected in various orientations with any connector. This again greatly simplifies the connection of panels.

Another particular advantage is that the connector 150 can be used to connect panels which are outfitted with anchors for various purposes. For example, panels P may be outfitted with anchors at least partially to protect the edges thereof. However, once installed, those anchors server as a convenient means to join panels at any time, merely by engaging the connectors therewith.

Figure 8:
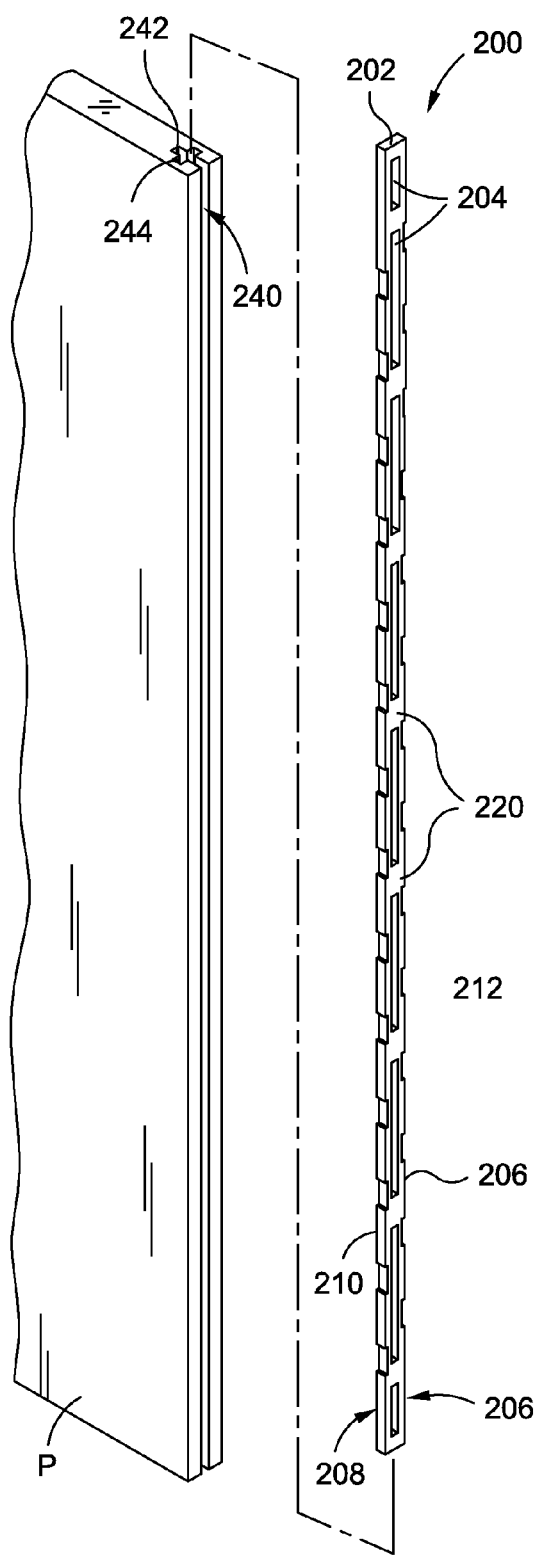
FIG. 8 illustrates an anchor associated with a panel in accordance with another embodiment of the invention.

Additional embodiments of the invention are illustrated in FIGS. 8-12. FIG. 8 illustrates another embodiment of an anchor 200. In this embodiment, the anchor 200 again comprises a body 202 having one or more associated mounts 220.

In one configuration, the anchor 200 comprises a body 202 having one or more slots 204 formed there through. In one embodiment, the mounts 220 comprise portions of the body 202 between adjacent slots 204, though the mounts 220 could comprise pins or other members, including pins which span and thus connect two spaced apart body members.

As illustrated, the body 202 may be generally planar and have a front 206, an opposing back 208 and first and second opposing sides 210,212. The slots 204 preferably extend through the anchor 200 from the front 206 to the back 208. The anchor 200 may have a generally rectangular cross-sectional shape, wherein a width (from side to side 210,212) is greater than its depth/thickness (from front 206 to back 208). However, the anchor 200 might have other shapes.

The anchor 200 is again preferably mounted to a panel P. As described herein, the anchor 200 might be mounted in various locations to the panel P, such as at an edge thereof. In one embodiment, a generally "T" shaped slot 240 is formed in the panel P. The slot 240 preferably has a first portion 242 which extends laterally into the panel P and a transverse portion 244 which extends generally perpendicular to the first portion 242 and which is located between the edge of the panel P and the terminus of the first portion 242 of the slot 240.

As illustrated in FIG. 8, an anchor 200 is positioned in the transverse portion 244 of the slot 240 of a panel P. In such a configuration, the anchor 200 and slot 240 cooperate to define a slot or trough (which extends into the panel P from an edge thereof) for accepting a connector and includes mounts 220 for securing or locking a connector in place, in similar manner to that described above. Of course, the anchor 200 might simply be mounted to the edge of panel P, such as in front of a slot which extends into the panel (rather than into a traverse slot portion which is set back from the edge of the panel P).

While the anchor 200 may be constructed of various materials (including metal and plastic), an advantage of the anchor 200 is that it can be inexpensively constructed from wood. In addition, the slot 240 in the panel P can be easily constructed because of its simpler shape (than the more complex slot configurations for the anchors 100 described above), such as by routing the slot 240 from the edge of the panel.

Once a panel P includes an anchor 200, a connector 250 may be mounted to the anchor 200 in similar manner to that described above. As described below, such a connector 250 may have a variety of configurations.

Figure 9:
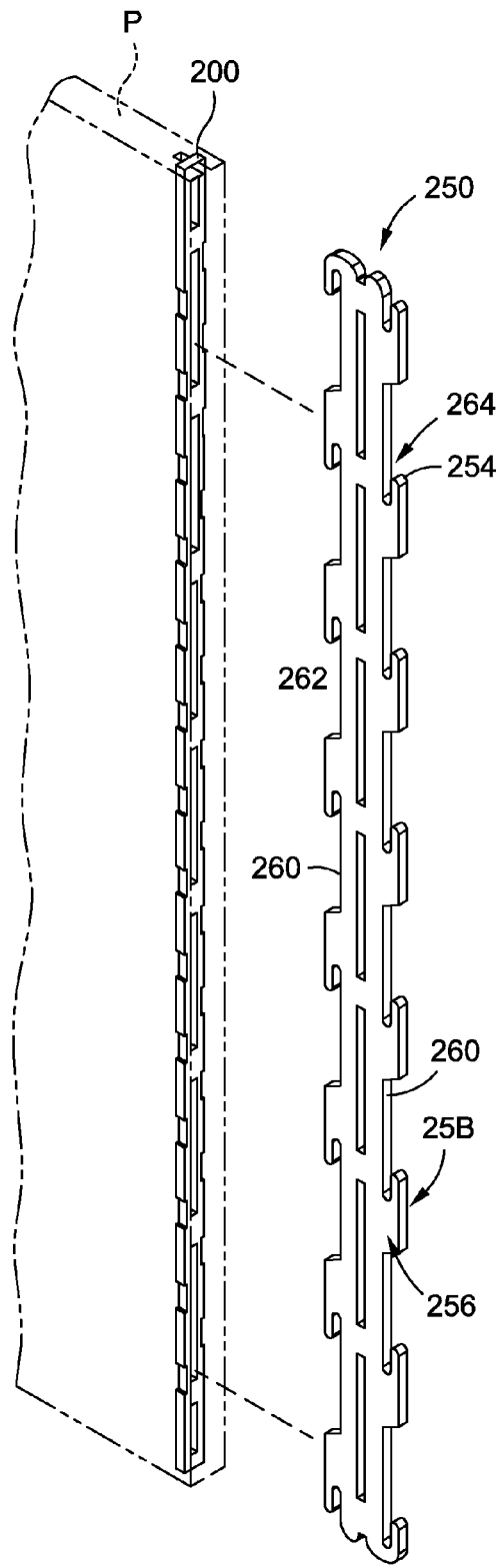
FIG. 9 illustrates the use of a connector with the anchor and panel illustrated in FIG. 8.

FIG. 9 illustrates one embodiment of a connector 250 which again comprises a body 252 which has a front 256, an opposing back or rear 258, and a pair of opposing edges 260,262. The body 252 is preferably generally planar, so as to fit into the slots 204 in an anchor 200.

The connector 250 has one or more projections 254. The projections 254 may extend outwardly from one or both sides or edges 260,262 of the body 252. Each projection 254 has at least one portion which is spaced from a main portion of the body 252 to define an adjacent mount/pin accepting slot or gap 264 (which preferably has a portion which extends parallel to a length of the connector 250), in similar manner to the connector 150 described above.

Figure 10:
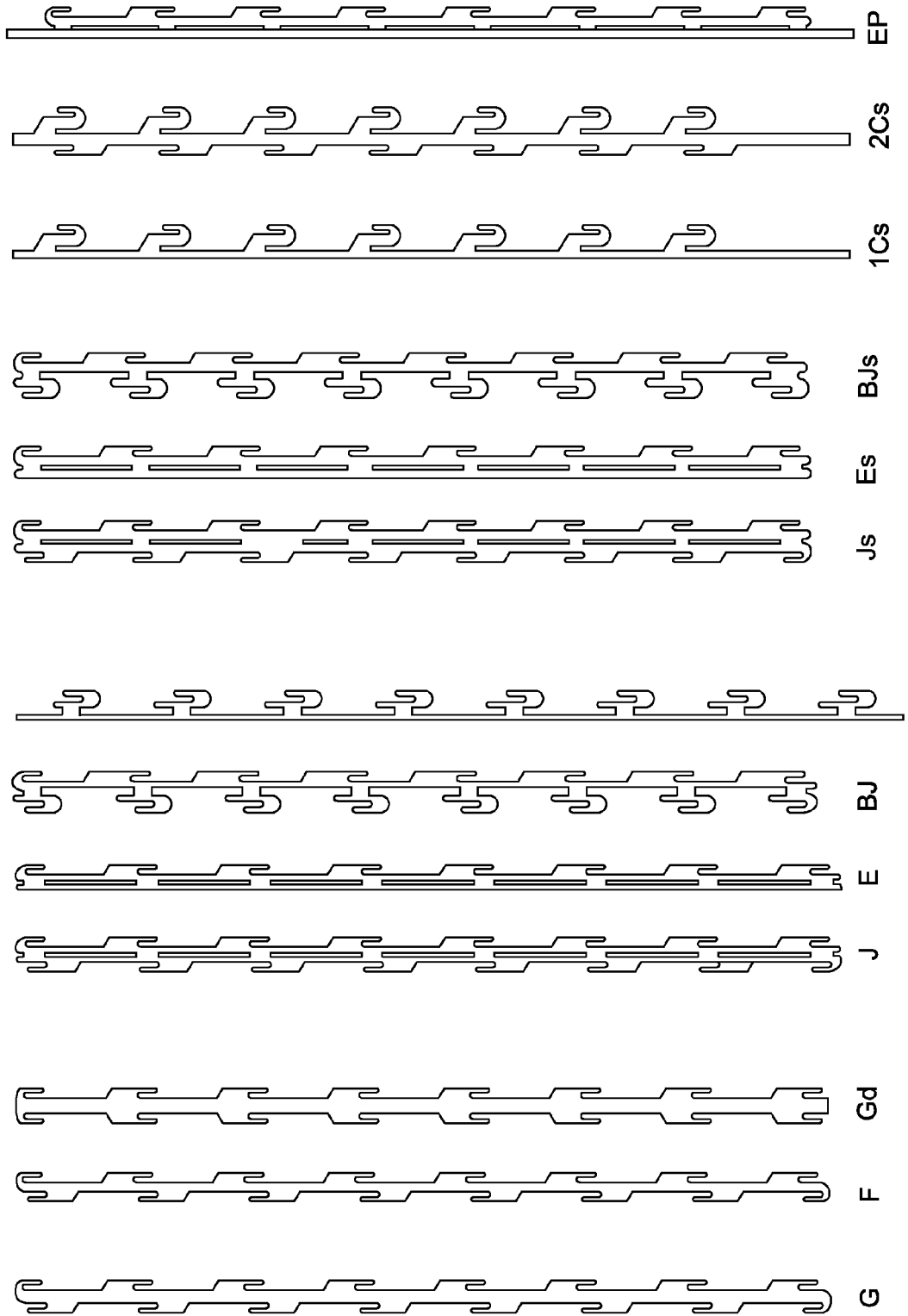
FIG. 10 illustrates a plurality of panel connectors in accordance with embodiments of the invention.

As illustrated in FIG. 10, the projections 254 may have various shapes or configurations. In general, the projections 254 are configured to pass through a slot in an anchor 200 from a first side and then, once the connector 250 is moved relative to the anchor 200, engage a second side of the anchor 200 (or the mounts/pins), thus preventing the connector and anchor from moving laterally (away from each other). In this regard, for example, the projections 254 could be U-shaped, T shaped, L-shaped or have other shapes.

In use, the connector 250 is placed adjacent to an edge of a panel P. The projections 254 on one side of the connector 250 are aligned with the slot 240 in the panel P and the slots 204 in the anchor 200. The connector 250 is pressed laterally into the panel P until the projections 254 have passed through the corresponding slots 204 in the anchor 200. At that time, the connector 250 is moved linearly along the slot 240 until the mounts 220 are located in the slots 264 in the connector 250. So positioned, the connector 250 and the panel P cannot be moved towards or apart from one another because the mounts 220 are located in the slots 264 in the connector 250.

Once again, in a preferred embodiment, the connector 250 is preferably configured to lock to the panel P with gravity. Thus, the connector 250 is preferably configured to be mounted to the panel P so that gravity aids in maintaining the connector 250 in its locked position. For example, relative to the embodiment illustrated in FIG. 9, the connector 250 includes projections 254 which extend downwardly so that gravity assists in holding the connector 250 down and in a position in which the projections 254 extend over the mounts 220 of the anchor 200.

In one embodiment, the anchors 200 and connectors 250 may have a length which is generally the same as the length of the panel P to which they are to be connected. However, they may, for example, be shorter. In addition, in preferred embodiment the anchors 200 define a plurality of slots 204 (at least two) and define a plurality of mounts 220 (at least two), though an anchor 200 could have a single mount 220 and associated slot 204.

While the anchors of the invention may be associated with an edge of a panel P, the anchors can be located elsewhere. For example, a panel P could have one or more anchors in a face (front and/or rear) thereof.

The connectors 250 may have various configurations, depending upon the application. FIG. 10 illustrates a number of different connectors 250 in accordance with principles of the invention.

G: a connector having projections on opposing edges which extend in opposing directions; the connector can be mounted to anchors of two panels to connect the panels, such as edge-to-edge or "in-line";

F: a connector having projections on opposing edges which are particularly configured to engage an anchor in an edge of one panel and an anchor in a face of another panel to join them in an L configuration;

Gd: a connector having projections on opposing edges which extend in the same direction; the connector can be mounted to anchors of two panels to connect the panels, such as edge-to-edge or "in-line":

J: a connector having projections on opposing edges which can be mounted to anchors of two panels, the connector also having slots which permit a third panel having an associated connector to be connected thereto, where by three panels can be connected in a T shape;

E: a connector having projections on one edge which can engage an anchor of one panel and having slots which permit a second panel having an associated connector to be connected thereto, whereby the two panels can be connected in an L shape;

BJ: a connector having projections on opposing edges, where one set of the projections is spaced outwardly by an offset which allows the projections to pass through slots in one panel and which then permits the connector to be connected to the anchors of two other panels, thus connecting three panels in a T shape;

BE: a connector having projections on one edge which are spaced outwardly by an offset which allows the projections to pass through slots in one panel and then connector with the anchor of another panel, whereby two panels may be connected in an L shape;

Js/Es and BJs: connectors like connector J, E and BJ described above, but where the connector is wider, permitting a thicker panel to be located between the other two panels;

1Cs: a connector having projections on one edge which are spaced outwardly by an offset which allows the projections to pass through slots in a J or BJ connector permits three panels to be connected in a T shape, and when passed through slots in a E connector permits two panels to be connected in an L shape;

2Cs: a connector having projections on opposing edges, where one set of projections is spaced outwardly by an offset which allows the projections to pass through slots in a J or BJ connector permits four panels to be connected in an X shape and when passed through slots in an E connector permits three panels to be connected in a T shape.

As indicated above, in one embodiment a connector 250 may be generally planar and thus have projections 254 or other features which are generally in the same plane. However, a connector 250 may have projections 254 or features which are in different planes. For example, a connector 250 could have four sides and have projections 254 extending from two adjacent sides such that the projections 254 are positioned 90 degrees to one another, thus permitting panels to be connected at right angles.

Figure 11:
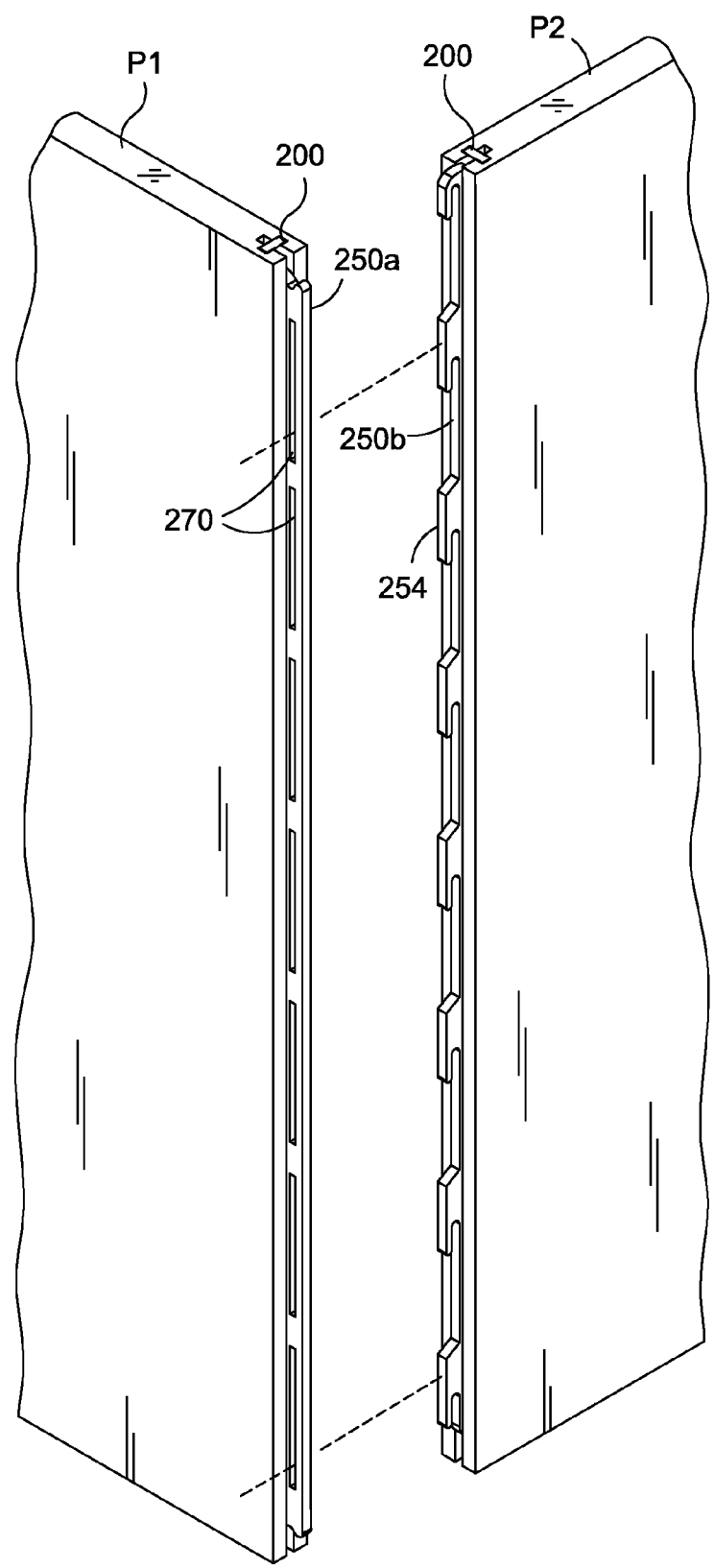
FIG. 11 illustrates two panels being connected together in accordance with another embodiment of the invention.

In another configuration, a connector 250 may be configured to be connected to another connector 250. As illustrated in FIG. 11, a connector 250a may include one or more slots 270 in the body 252 thereof. The slots 270 may, for example, extend from the front to the rear of the body. As illustrated, projections 254 along one side or edge of a first connector 250a may be used to mount the first connector 250a to a first panel P1. A second connector 250b may be mounted to a second panel P2. As illustrated, projections 254 on the second connector 250b may be passed through the slots 270 in the first connector 250a, thus permitting the first and second panels P1 and P2 to be connected at right angles to one another.

Figure 12:
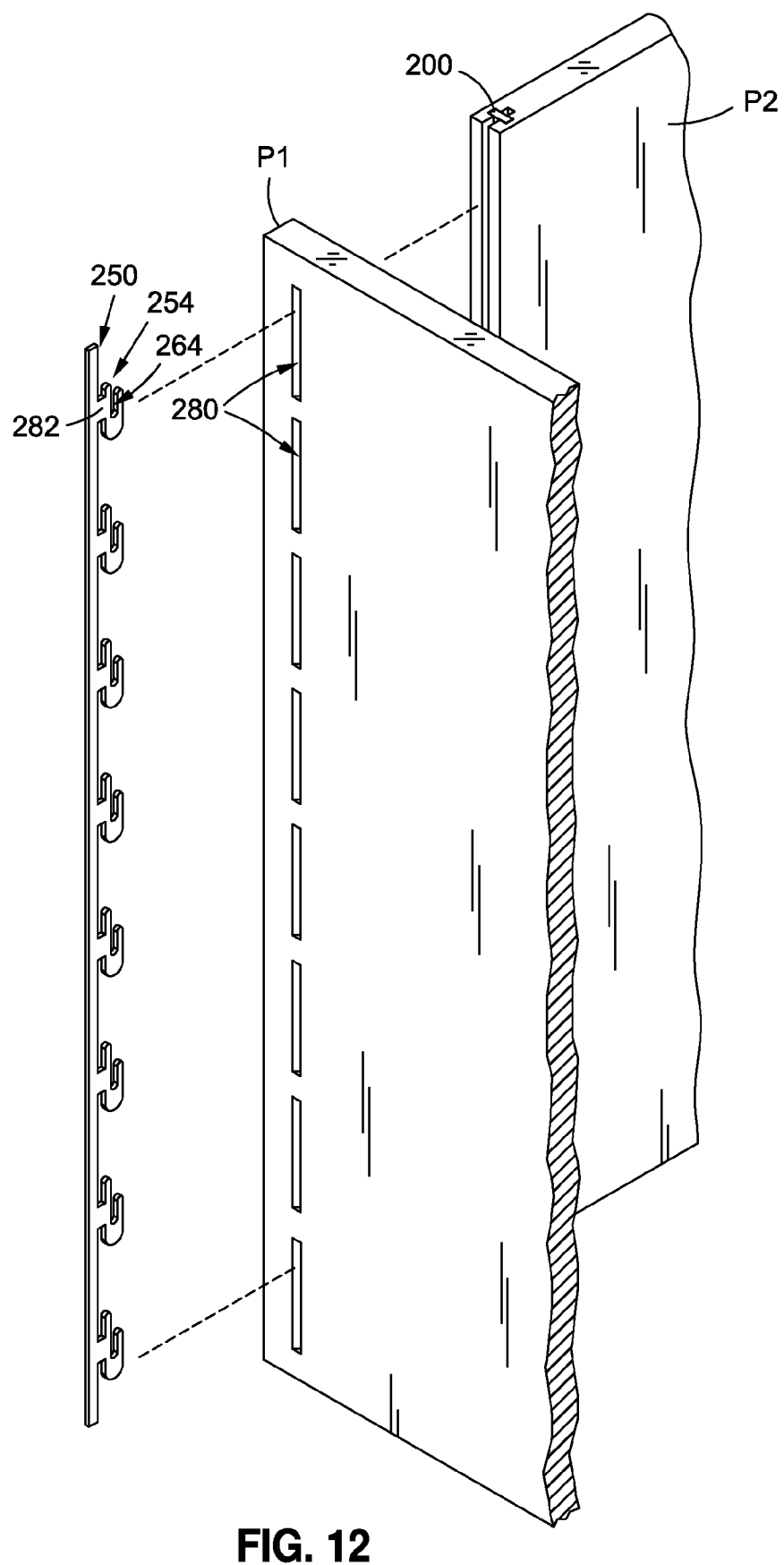
FIG. 12 illustrates two panels being connected together in accordance with yet another embodiment of the invention.

In one embodiment, the connectors of the invention may be configured to secondarily engage one or more panels. For example, a connector may be configured to extend through one panel when being connected to another panel. As illustrated in FIG. 12, a connector 200 has projections 254 formed as an arm which is spaced outwardly from the main body of the connector by a pin 282. The arms may be extended through slots 280 which extend through a first panel P1 until the pin 282 is located in those slots 280. At that time, the projecting arm is located on the opposite side of the first panel P1 from the remainder of the connector 250. The projecting arm can then be inserted into or mated with an anchor of a second panel P2. In this manner, at least two panels can be connected using a single connector where the connector indirectly engages at least one panel and directly engages (by connection to an anchor), at least one other panel.

It will be appreciated that by using the anchors and various connectors, two or more panels P may be connected or joined in a secure fashion. In fact, the panels P may be connected in various orientations (in a row, in L shapes, T shapes, X shapes and others). The panels P may thus be used to form walls, display mounts and the like. The connected panels P may be used to form cubicles or other types of enclosures.

Another important aspect of the present invention is that all panels are "generic", meaning that they are, unlike panels of the prior art which are outfitted with male or female locking connectors, able to always be connected to other panels. This is due to each panel having the same anchoring configuration which permits all panels to be connected with connectors. Thus, a user of the panels does not need to ensure that they have mating "male" and "female" panels which can be connected. In addition, the user does not need to have specific panels for different applications/arrangements, such as different panels to permit T or L shaped connections. Again, all panels are generic and all connections and configurations of the panels are enabled by the connectors.

It will be appreciated that while the connection system described herein, including the connectors and anchors, is preferably used with the structural panels described herein, the connection system may be used with other types of panels, such as solid panels. However, the benefits of the structural panels of the invention are not obtained in such a configuration.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A system for connecting a first structural panel and a second structural panel comprising:
  a first anchor configured to be mounted in a T shaped slot formed in said first structural panel, said first anchor comprising an elongate body defining a plurality of slots separated by one or more mounts;

a second anchor configured to be mounted in a T shaped slot formed in a second structural panel, said second anchor comprising an elongate body defining a plurality of slots separated by one or more mounts; and a elongate connector, said connector comprising a body having a first side and a second side and at least a first edge and a second edge, at least one first projection extending outwardly from said first edge of said body and having an adjacent first slot, said first projection configured to pass into said T shaped slot in said first structural panel and through one of said slots in said first anchor, a least one second projection extending outwardly from said second edge of said body and having an adjacent second slot, said second projection configured to pass into said T shaped slot in said second structural panel and through one of said slots in said second anchor, whereby when said connector is moved relative to said first and second anchor, at least one mount of said first anchor moves into a corresponding first slot in said elongate connector adjacent to at least one first projection and at least one mount of said second anchor moves into a corresponding second slot in said elongate connector adjacent to at least one second projection and lateral movement of said first and second anchors relative to said connector is prevented.

2. The system in accordance with claim 1 wherein said first and second sides of said connector are located at 90 degrees to one another.

3. The system in accordance with claim 1 wherein said body of said connector is generally planar, having a first side and an opposing second side and a first edge and a second edge oriented generally perpendicular to said first and second sides.

4. The system in accordance with claim 1 wherein said one or more mounts of said first anchor comprise cross-members extending between opposing sides of said first anchor.

5. The system in accordance with claim 1 wherein said first and second anchors are generally planar and said plurality of slots comprising openings extending transversely through said first and second anchors.

6. The system in accordance with claim 1 wherein said at least one first projection extends outwardly from said first edge of said first structural panel and then downwardly, wherein said adjacent slot is located between said at least one first projection and said first edge.

7. In combination:
a first structural panel having a T shaped slot in at least one edge thereof;
a first anchor mounted in said T shaped slot, said first anchor comprising an elongate body defining a plurality of slots separated by one or more mounts;
a second structural panel having a T shaped slot in at least one edge thereof;
a second anchor mounted in said T shaped slot formed in a second structural panel, said second anchor comprising an elongate body defining a plurality of slots separated by one or more mounts; and
a elongate connector, said connector comprising a body having a first side and a second side and at least a first edge and a second edge, at least one first projection extending outwardly from said first edge of said body and having an adjacent first slot, said at least one first projection extending through one of said slots in said first anchor, a least one second projection extending outwardly from said second edge of said body and having an adjacent second slot, said at least one second projection extending through one of said slots in said second anchor, said connector moved relative to said first and second anchor so that at least one mount of said first anchor is located in a corresponding first slot in said elongate connector adjacent to at least one first projection and at least one mount of said second anchor is located in a corresponding second slot in said elongate connector adjacent to at least one second projection and lateral movement of said first and second anchors relative to said connector is prevented.

8. The combination in accordance with claim 6 wherein said T shaped slot in said first structure panel has a first lateral portion extending inwardly from said at least one edge and a second transverse portion to said first lateral portion and wherein said first anchor is located in said transverse portion.

9. The combination in accordance with claim 8 wherein said at least one slot of said first anchor is aligned with said lateral portion of said slot.

* * * * *